United States Patent
Zeevi et al.

(10) Patent No.: US 8,078,495 B2
(45) Date of Patent: Dec. 13, 2011

(54) POINT-OF-SALE DISPLAY SYSTEM

(75) Inventors: Daniel Zeevi, Or Yehuda (IL); Noam Levavi, Herziliya (IL)

(73) Assignee: YCD Multimedia Ltd., Kibbutz Shefayim (IL)

( * ) Notice: Subject to any disclaimer, the term of this patent is extended or adjusted under 35 U.S.C. 154(b) by 859 days.

(21) Appl. No.: 12/082,809

(22) Filed: Apr. 14, 2008

(65) Prior Publication Data
US 2009/0259516 A1   Oct. 15, 2009

(51) Int. Cl.
*G06Q 30/00* (2006.01)
(52) U.S. Cl. .................................. 705/14.65
(58) Field of Classification Search ............... 705/14.65
See application file for complete search history.

(56) References Cited

U.S. PATENT DOCUMENTS

| | | | |
|---|---|---|---|
| 5,331,544 | A | 7/1994 | Lu et al. |
| 5,459,306 | A | 10/1995 | Stein et al. |
| 6,119,099 | A | 9/2000 | Walker et al. |
| 6,223,163 | B1 | 4/2001 | Van Luchene |
| 6,401,074 | B1 | 6/2002 | Sleeper |
| 6,529,879 | B1 | 3/2003 | Hasegawa |
| 7,136,906 | B2 | 11/2006 | Giacalone, Jr. |
| 7,249,053 | B2 | 7/2007 | Wohlers et al. |
| 7,383,200 | B1 | 6/2008 | Walker et al. |
| 2002/0033794 | A1 * | 3/2002 | Paulson ................ 345/156 |
| 2002/0072972 | A1 | 6/2002 | Lamont |
| 2003/0083936 | A1 | 5/2003 | Mueller et al. |
| 2003/0220830 | A1 | 11/2003 | Myr |
| 2004/0103570 | A1 | 6/2004 | Ruttenberg |
| 2006/0235755 | A1 | 10/2006 | Mueller et al. |
| 2006/0280315 | A1 | 12/2006 | Norris et al. |
| 2007/0073585 | A1 | 3/2007 | Apple et al. |
| 2007/0073589 | A1 | 3/2007 | Vergeyle et al. |
| 2007/0143186 | A1 | 6/2007 | Apple et al. |

OTHER PUBLICATIONS

U.S. Appl. No. 09/603,677, filed Jun. 26, 2000, Mueller et al.
IBM SurePOS 500 Series, IBM Retail Store Solutions, IBM Corporation, Research Triangle Park, NC 27709, USA, May 2007.
Visual Deal™ by RetailDNA, LLC, 2002 (www.retaildna/vd_howitworks.com).
SBOnet™, Dumac Business Systems Inc., East Syracuse, NY 13057, USA, 2002 (www.dumac.com/solutions/quickservice/sbonet.html).
International Application PCT/IB09/51384 Search Report dated Apr. 2, 2010.
International Application PCT/IB09/55456 Search Report dated Jul. 13, 2010.
U.S. Appl. No. 12/337,786 Official Action dated Jun. 21, 2011.

* cited by examiner

*Primary Examiner* — James W Myhre
(74) *Attorney, Agent, or Firm* — Husch Blackwell LLP (57) ABSTRACT

A computer-implemented method for data display is provided, which includes receiving a request for a product from a customer in a first line at a retail location having multiple adjacent customer lines. An advertisement is selected responsively to the requested product, and is displayed on a customer-facing electronic display positioned at a second line, which is in proximity to the first line. Other embodiments are also described.

18 Claims, 4 Drawing Sheets

FIG. 2A

FIG. 3

POINT-OF-SALE DISPLAY SYSTEM

FIELD OF THE INVENTION

The present invention relates generally to point-of-sale systems, and specifically to methods for displaying advertising content to customers during retail transactions.

BACKGROUND OF THE INVENTION

Retail locations execute sales transactions using point-of-sale ("POS") terminals, such as cash registers. Some POS terminals additionally track purchases made and adjust a database of store inventory accordingly. Some POS systems print advertisements and/or consumer information on the sales receipt, or display advertisements and/or consumer information on an auxiliary display.

U.S. Pat. No. 6,401,074 to Sleeper, which is incorporated herein by reference, describes an augmented POS system that, during a retail transaction, displays and may broadcast promotional information to a customer selected on the basis of the context of the transaction. An existing front-end POS system is augmented with an auxiliary display device intended for viewing by a customer while the customer interacts with the sales clerk in order to conduct a retail transaction. Software components are added to the point of sale system in order to generate messages corresponding to events that occur during the transaction and to, in turn, translate those events into display images displayed on the auxiliary display device. The auxiliary display device can display text, broadcast music or audio information, show video clips and other real-time dynamic media, and display static images.

US Patent Application Publication 2004/0103570 to Ruttenberg, which is incorporated herein by reference, describes a three-dimensional advertising display and method of use. The advertising display includes a structure and a plurality of sides that cooperatively form an advertising display. At least one side of the plurality of sides includes an electronic panel display and at least one side of the plurality of sides includes at least one printed advertisement. A triangular structure is preferred.

US Patent Application Publication 2003/0083936 to Mueller et al., which is incorporated herein by reference, describes techniques for receiving order information based on an order of a customer, and determining an offer for the customer based on the order information and at least one of a genetic program and a genetic algorithm. The techniques transform data from a plurality of data sources into genetic codes or "synthetic" DNA. The DNA is then used within an artificial biological environment, which is replicated. For example, each transaction may be analogized to an individual (species) in a population. When transactions are proven successful under certain environmental conditions (e.g., particular cashier or customer, time of day, day of week, certain store configuration, whether the destination is drive through or dine in, customer demographics), the success is propagated. By culling unsuccessful transactions from the synthetic ecosystem, the described techniques can help eliminate undesirable transactions. Conversely, the described techniques can encourage the propagation of successful transactions, which drives incremental performance improvements.

US Patent Application Publication 2006/0235755 to Mueller et al., which is incorporated herein by reference, describes techniques in which a price associated with a menu item is determined automatically based at least in part on revenue management information. A menu display is updated on an electronic display device such as a digital menu board to include the automatically-determined price.

U.S. Pat. No. 6,223,163 to Van Luchene, which is incorporated herein by reference, describes a POS terminal or other computing device that provides a plurality of offers to customers, and then measures a performance rate of each offer. For example, the acceptance rate or the profit rate of the offers may be measured. Based on the performance rates, a subset of offers is selected. In one embodiment, the highest performing offers are selected. In another embodiment, those offers having performance rates above a predetermined threshold are selected. The selected subset of offers is then provided, while the remaining, less desirable offers are discontinued.

U.S. Pat. No. 6,119,099 to Walker et al., which is incorporated herein by reference, describes a POS terminal that determines an upsell to offer in exchange for the change due to a customer in connection with a purchase. The POS terminal preferably maintains a database of at least one upsell price and a corresponding upsell to offer a customer in exchange for the change due to him. If the customer accepts the upsell, the cashier so indicates by pressing a selection button on the POS terminal. The required payment amount for the customer to pay is then set equal to the rounded price, rather than the purchase price. Thus, the customer receives the upsell in exchange for the coins due to him, and the coins need not be exchanged between the customer and the POS terminal.

RetailDNA, LLC (West Palm Beach, Fla., USA) develops marketing solutions that provide cash registers with interactive advertising capabilities. RetailDNA markets the Visual Deal™, which uses a display at the front counter to offer customers an additional menu item in lieu of their coin change. The displays can also be used to present pre-order promotions, order confirmation, up-selling, and third party advertisements.

U.S. patent application Ser. No. 9/603,677, which is incorporated herein by reference, describes techniques for offering a supplemental product or service to a user during a transaction at a POS terminal, either in addition to the products and/or services the user is purchasing or as a replacement to one or more of the products and/or services that the user is purchasing. The method may be implemented in a retail environment in which the user is purchasing products and/or services at a cash register or other POS terminal. The method may also be implemented in an online environment in which the user is purchasing products and/or service.

SUMMARY OF THE INVENTION

In embodiments of the present invention, a point-of-sale (POS) merchandising system displays advertisements to customers waiting in a line near a customer ordering a product, wherein the advertisements are displayed responsively to the product ordered. The system typically is deployed at a retail location having a plurality of POS terminals, each of which includes a customer-facing electronic display. The system displays the advertisements on an electronic display in the line of the customer making the purchase, and/or in lines other than that of the customer making the purchase. Nearby customers who hear and/or see the purchasing customer place the order are often influenced by the order, and are therefore more likely to purchase the same ordered product or another product having a purchasing correlation with the ordered product. Promoting the purchased product or a related product to these nearby customers thus often causes an increase in sales for the retailer.

Customers in line behind the purchasing customer often cannot effectively see the customer-facing display in their line, because the purchasing customer and other customers in the line block the view of the display. The POS merchandising system overcomes this problem by displaying the advertisements on customer-facing displays in lines other than that of the customer making the purchase. Customers waiting behind the purchasing customer generally have a clearer view of such other customer-facing displays.

The system is generally deployed at a retail location at which customers place purchase orders at the point-of-sale, rather than gathering products for purchase beforehand. Such retail locations include, but are not limited to, fast-food restaurants, cafes, and coffee shops. Because the customers make final purchase decisions while in line or at the point-of-sale, advertising during these decision-making periods can strongly influence the purchase decisions of the customers.

There is therefore provided, in accordance with an embodiment of the present invention, a computer-implemented method for data display, the method including:

receiving a request for a product from a customer in a first line at a retail location having multiple adjacent customer lines;

selecting an advertisement responsively to the requested product; and displaying the advertisement on a customer-facing electronic display positioned at a second line, which is in proximity to the first line.

Typically, displaying the advertisement includes displaying the advertisement within one minute after receiving the request.

For some applications, selecting the advertisement includes selecting an advertisement that promotes the requested product. Alternatively, the requested product includes a first product, and selecting the advertisement includes selecting an advertisement that promotes a second product which is different from the first product and has a purchasing correlation with the first product.

For some applications, the customer-facing electronic display positioned at the second line is a first customer-facing electronic display, and displaying the advertisement includes displaying the advertisement on the first customer-facing electronic display and on a second customer-facing electronic display positioned at the first line.

Optionally, selecting the advertisement includes using a genetic algorithm to improve a set of rules for selecting the advertisement.

There is further provided, in accordance with an embodiment of the present invention, a computer-implemented method for data display, the method including:

receiving a request for a product from a customer at a head of a line in a retail location; and responsively to receiving the request, displaying an advertisement promoting the requested product on a customer-facing electronic display in the retail location.

Typically, displaying the advertisement includes displaying the advertisement within one minute after receiving the request.

For some applications, displaying the advertisement includes displaying the advertisement on the customer-facing electronic display positioned at the line. Alternatively or additionally, the line is a first line, and displaying the advertisement includes displaying the advertisement on the customer-facing electronic display positioned at a second line, which is in a proximity to the first line.

Optionally, displaying the advertisement includes selecting the advertisement using a genetic algorithm to improve a set of rules for selecting the advertisement.

There is still further provided, in accordance with an embodiment of the present invention, a computer-implemented method including:

defining a rule that specifies a ratio of first advertising time allocated to a first set of one or more first products to second advertising time allocated to a second set of one or more second products;

assigning at least first and second initial values to the ratio;

during a first initial advertising session, displaying respective first advertisements and second advertisements for the first and second sets of the products in accordance with the rule using the first initial value of the ratio on one or more customer-facing electronic displays in one or more retail locations;

during a second initial advertising session, displaying the respective first advertisements and second advertisements in accordance with the rule using the second initial value of the ratio on the one or more customer-facing electronic displays in the one or more retail locations;

recording respective measures of sales performance at the retail locations during at least the first and second initial advertising sessions;

assigning an optimized value to the ratio responsively to the measures of the sale performance; and during at least one optimized advertising session after the first and second initial advertising sessions, displaying, on the displays, the respective first advertisements and second advertisements in accordance with the rule using the optimized value of the ratio.

Typically, the first set includes a plurality of the first products, and the second set includes a plurality of the second products.

For some applications, displaying the respective first advertisements and second advertisements during the first initial, second initial, and optimized advertising session includes assigning the first advertisements to a primary advertising loop, assigning the second advertisements to a secondary advertising loop, and displaying the first advertisements of the primary advertising loop interspersed with the second advertisements of the secondary advertising loop.

For some applications, sales of the products of the first set are greater than sales of the products of the second set.

For some applications, assigning the optimized value to the ratio includes using a genetic algorithm having as inputs the first and second initial values of the ratio and the measures of the sale performance.

There is additionally provided, in accordance with an embodiment of the present invention, apparatus including:

a point-of-sale (POS) terminal positioned at a first line at a retail location having multiple adjacent customer lines, which is configured to receive a request for a product from a customer;

a promotion processor, configured to select an advertisement responsively to the requested product; and a customer-facing electronic display positioned at a second line, which is in proximity to the first line, which is configured to display the selected advertisement.

Optionally, the POS terminal includes the promotion processor.

There is yet additionally provided, in accordance with an embodiment of the present invention, apparatus including:

a point-of-sale (POS) terminal positioned in a retail location, configured to receive a request for a product from a customer; and a customer-facing electronic display positioned in the retail location, which is configured to display an advertisement promoting the requested product, responsively to receipt of the request.

There is also provided, in accordance with an embodiment of the present invention, apparatus including:

one or more customer-facing electronic displays positioned in one or more retail locations; and an advertising processor, configured to define a rule that specifies a ratio of first advertising time allocated to a first set of one or more first products to second advertising time allocated to a second set of one or more second products; assign at least first and second initial values to the ratio; during a first initial advertising session, drive the electronic displays to display respective first advertisements and second advertisements for the first and second sets of the products in accordance with the rule using the first initial value of the ratio; during a second initial advertising session, drive the electronic displays to display the respective first advertisements and second advertisements in accordance with the rule using the second initial value of the ratio; record respective measures of sales performance at the retail locations during at least the first and second initial advertising sessions; assign an optimized value to the ratio responsively to the measures of the sale performance; and during at least one optimized advertising session after the first and second initial advertising sessions, drive the electronic displays to display the respective first advertisements and second advertisements in accordance with the rule using the optimized value of the ratio.

There is further provided, in accordance with an embodiment of the present invention, a computer software product including a tangible computer-readable medium in which program instructions are stored, which instructions, when read by a computer, cause the computer to receive a request for a product from a customer in a first line at a retail location having multiple adjacent customer lines, select an advertisement responsively to the requested product, and display the advertisement on a customer-facing electronic display positioned at a second line, which is in proximity to the first line.

There is still further provided, in accordance with an embodiment of the present invention, a computer software product including a tangible computer-readable medium in which program instructions are stored, which instructions, when read by a computer, cause the computer to receive a request for a product from a customer at a head of a line in a retail location, and, responsively to receiving the request, display an advertisement promoting the requested product on a customer-facing electronic display in the retail location.

There is additionally provided, in accordance with an embodiment of the present invention, a computer software product including a tangible computer-readable medium in which program instructions are stored, which instructions, when read by a computer, cause the computer to define a rule that specifies a ratio of first advertising time allocated to a first set of one or more first products to second advertising time allocated to a second set of one or more second products; assign at least first and second initial values to the ratio; during a first initial advertising session, display respective first advertisements and second advertisements for the first and second sets of the products in accordance with the rule using the first initial value of the ratio on one or more customer-facing electronic displays in one or more retail locations; during a second initial advertising session, display the respective first advertisements and second advertisements in accordance with the rule using the second initial value of the ratio on the one or more customer-facing electronic displays in the one or more retail locations; record respective measures of sales performance at the retail locations during at least the first and second initial advertising sessions; assign an optimized value to the ratio responsively to the measures of the sale performance; and, during at least one optimized advertising session after the first and second initial advertising sessions, display, on the displays, the respective first advertisements and second advertisements in accordance with the rule using the optimized value of the ratio.

The present invention will be more fully understood from the following detailed description of embodiments thereof, taken together with the drawings, in which:

DETAILED DESCRIPTION OF EMBODIMENTS

Figure 1:
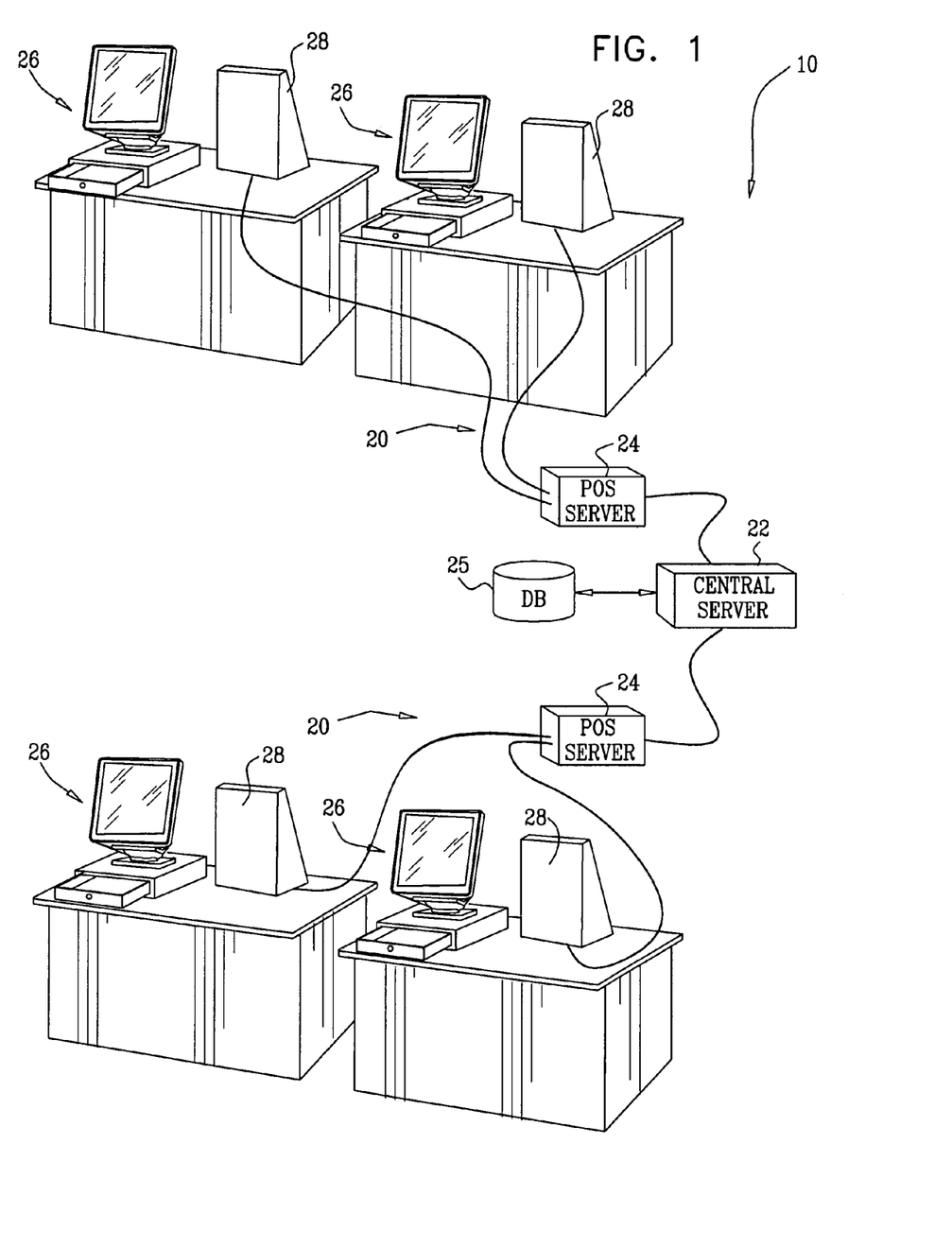
FIG. 1 is a schematic, pictorial illustration of a distributed merchandising system, in accordance with an embodiment of the present invention.

FIG. 1 is a schematic, pictorial illustration of a distributed merchandising system 10, in accordance with an embodiment of the present invention. Distributed merchandising system 10 comprises one or more point-of-sale (POS) merchandising systems 20, which are deployed at respective retail locations, and at least one central server 22, which is deployed at a central location that manages the retail locations, such as when the retail locations are branches of a retail chain. Each POS merchandising system 20 comprises a POS server 24, a plurality of POS terminals 26, and a plurality of customer-facing electronic displays 28. The POS terminals are in communication with the POS servers, such as over a local area network (LAN), and the POS servers are in communication with the central server, such as over telephone lines or a wide area network (WAN), such as the Internet. Alternatively, POS servers 24 are located remotely from the retail locations, such in one or more central locations, e.g., in the same location as central server 22.

For some applications, each of customer-facing electronic displays 28 is associated, e.g., positioned in a vicinity of, a respective one of POS terminals 26. Alternatively or additionally, one or more customer displays 28 are positioned elsewhere in the retail establishment in view of customers waiting in line. The customer displays may be connected directly to their corresponding POS terminals, to the POS merchandising system at the retail location, to the central server, and/or to one or more other computers that are programmed in software or hardware to drive the displays. Regardless of the precise configuration, the customer displays are configured responsively to orders placed at the POS terminals.

Central server 22 and POS servers 24 typically comprise one or more respective standard computer servers with appropriate memory, communication interfaces and software for carrying out the functions prescribed by the present invention. This software may be downloaded to the systems in electronic form over a network, for example, or it may alternatively be supplied on tangible media, such as CD-ROM. The memory may comprise a non-volatile memory, such as one or more hard disk drives, and/or a volatile memory, such as random-access memory (RAM). The central server and/or the POS servers are typically coupled to at least one database 25, such as for storing product information and sales history and analytical data.

Each of customer displays 28 comprises a screen, such as a flat panel monitor or cathode ray tube monitor, which is capable of displaying visual information such as images, text, and video. The customer displays optionally include an audio output means, such as a speaker, which generates sounds.

Each of POS terminals 26 comprises at least one microprocessor, which is connected to a memory, such as a RAM, hard disk, or combination thereof. For some applications, the POS terminals comprises general purpose personal computers programmed in software to carry out the functions of the POS terminals, while for the other applications, the POS terminals comprise special-purpose hardware, e.g., the IBM 4683, IBM 4693 or IBM SurePOS™ 500 Series POS terminals manufactured by International Business Machines. Alternatively, some or all of the POS terminals may comprise "dumb" terminals, which are controlled, partially or substantially, by a separate device, such as POS server 24, which is either in the same location with the terminal or located remotely therefrom. As is known in the art, POS terminals include a cashier-facing display for displaying information to a cashier operating the terminal; one or more input devices, such as a keyboard; a cash drawer; and a printing device that prints out a sales receipt at the conclusion of a transaction. The POS terminals are used at each check-out line or similar retail transaction station within a retail location.

Figure 2A:
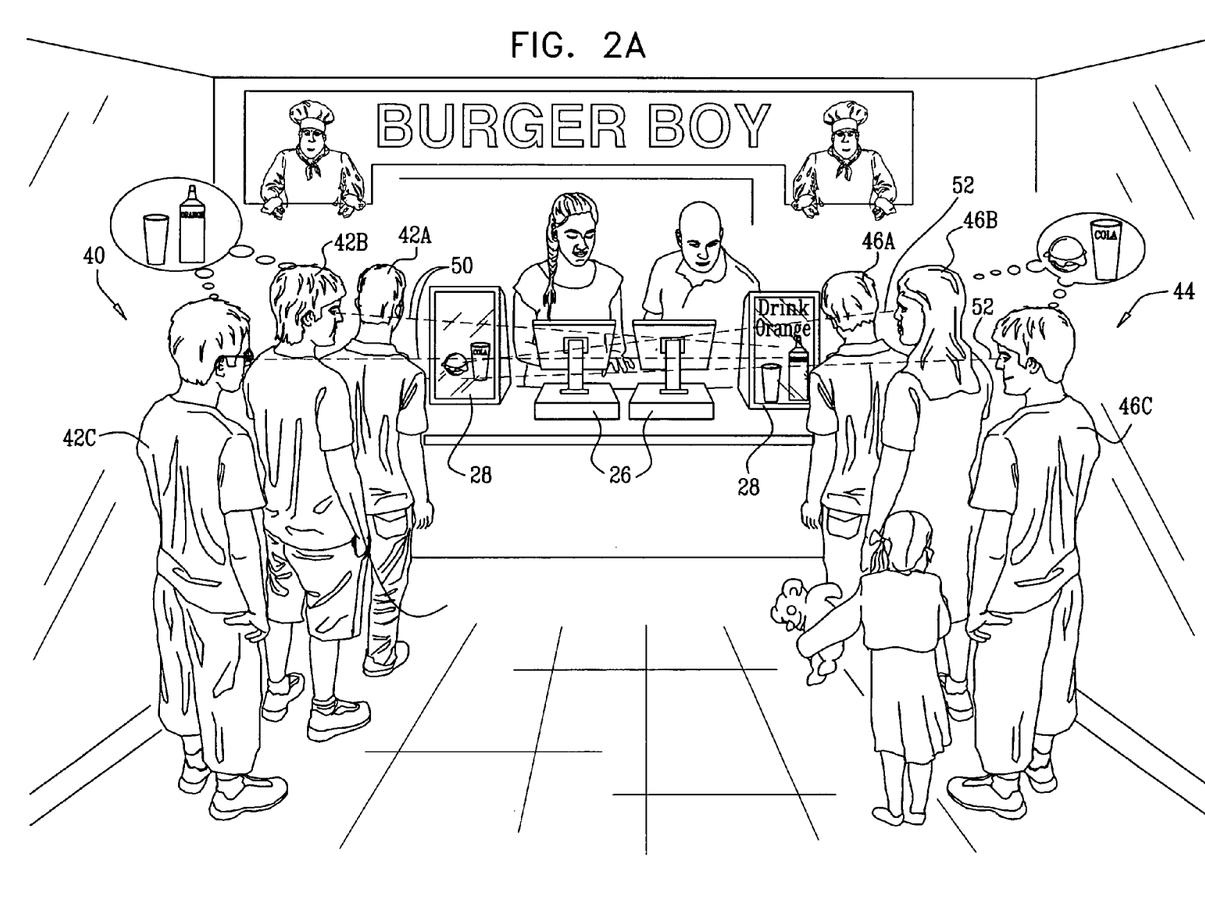
FIGS. 2A-B are schematic illustrations of a POS merchandising system deployed at a retail establishment, in accordance with an embodiment of the present invention.
Figure 2B:
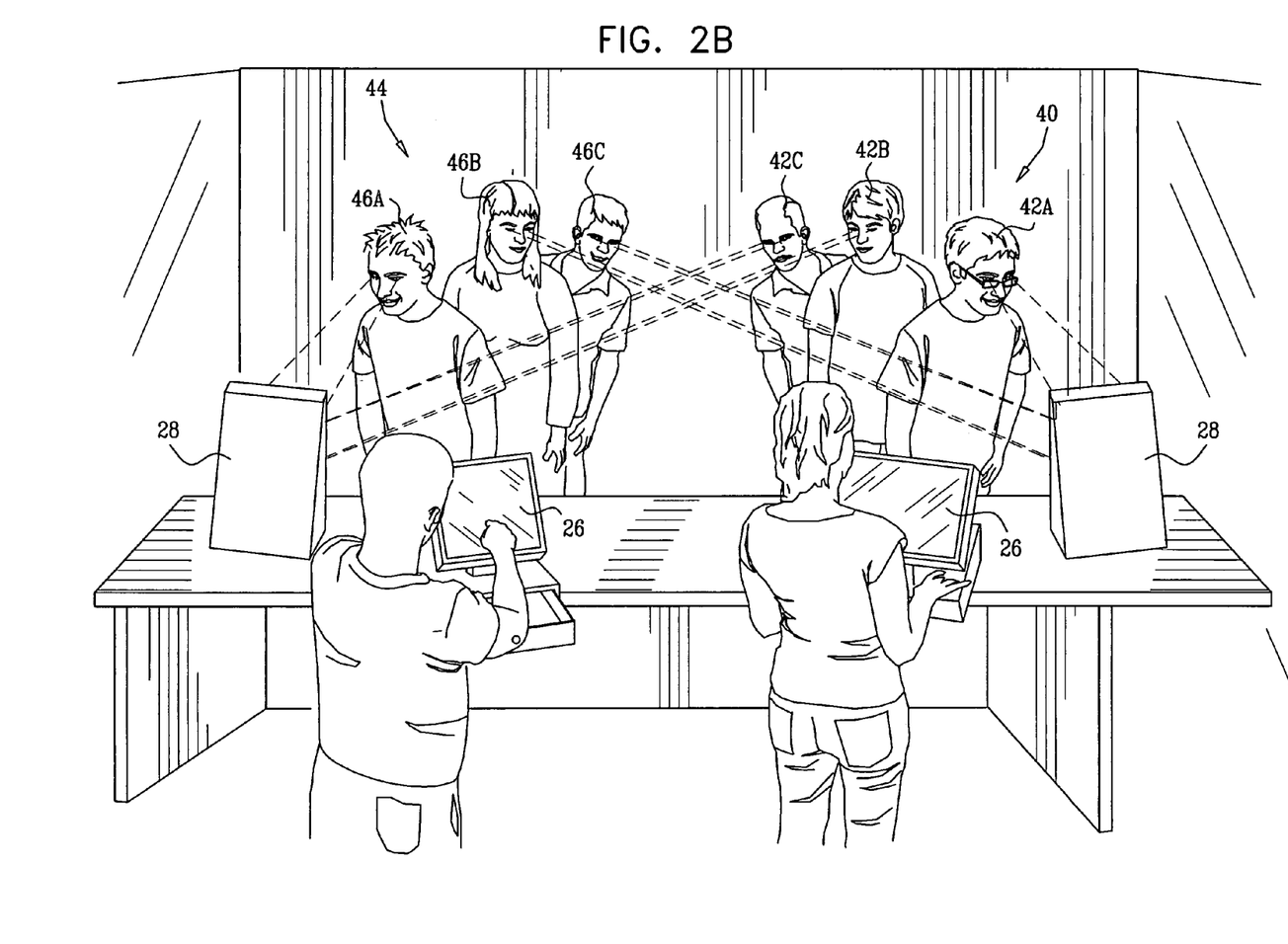

Reference is made to FIGS. 2A-B, which are schematic illustrations of one of POS merchandising systems 20 deployed at a retail establishment, in accordance with an embodiment of the present invention. FIGS. 2A-B show an exemplary deployment of the system at a restaurant including two check-out lines, a left line 40 in which customers 42A, 42B, and 42C are waiting, and a right line 44 in which customer 46A, 46B, and 46C are waiting. (FIG. 2A is a view from behind the customers, while FIG. 2B is a view from behind the cashiers.) In actual deployments, more than one line is common. The customers in each of the lines are served by respective cashiers 48 using respective POS terminals 26. A customer-facing electronic display 28 is positioned at each line for convenient viewing by at least the first customer in the line. As mentioned above, additional customer-facing electronic displays 28 may be positioned elsewhere in the retail establishment for viewing by the customers waiting in line (configuration not shown).

In an embodiment of the present invention, POS merchandising system 20 is configured to display advertisements on one or more customer-facing electronic displays 28 to customers waiting in line near a customer making a purchase at one of POS terminals 26. The system selects which advertisements to display responsively to the purchase. For some applications, the system advertises one or more of the products being purchased or ordered by the customer. Alternatively or additionally, the system advertises one or more products related to one or more of the products being purchased or ordered, as described hereinbelow in more detail. The advertisements include video or still images of the products, or a combination of still and video images, and optionally include audio.

POS merchandising system 20 displays the advertisements on customer displays 28 in lines other than that of the customer making the purchase, and/or on the customer display in the line of the customer making the purchase. For example, when customer 42A, the first customer in left line 40, is placing an order for a product, the system displays an advertisement for the product, or for a related product, on the customer display positioned at right line 44, and/or on the customer display positioned at left line 40.

Nearby customers who hear and/or see the purchasing customer place an order are often influenced by the order, and are therefore more likely to purchase the same ordered product or another product having a purchasing correlation with the ordered product. Promoting the purchased product or a related product to these nearby customers thus often causes an increase in sales for the retailer. The system generally presents the advertisement within 5 minutes of the placement of the order by the purchasing customer, such as within one minute, within 40 seconds, or within 16 seconds.

Customers in line behind the purchasing customer often cannot effectively see the customer-facing display in their line, because the purchasing customer and other customers in the line block the view of the display. For example, customer 42B and 42C in left line 40 cannot always easily see customer display 28 in left line 40, because customer 42A (who is making the purchase) blocks the views of these customers. The system overcomes this problem by displaying the advertisements on customer-facing displays in lines other than that of the customer making the purchase. For example, customers 42B and 42C in left line 40 generally have a clear view of customer display 28 in right line 44, as symbolically indicated by lines of vision 50. Similarly, display of the advertisement on the customer display at line 40 provides a clear view to customers 46B and 46C waiting in second line 44, as symbolically indicated by lines of vision 52.

For some applications, POS merchandising system 20 receives indications of ordered products from POS terminals 26. However, in some deployments, the POS terminals are not configured to provide such indications to the POS merchandising system. For these deployments, the POS merchandising system comprises microphones installed near each of the POS terminals, and positioned to detect the voice of the customer placing an order. The POS merchandising system uses voice recognition, as is known in the art, to derive the names of the ordered products, and communicates indications of the ordered products to the POS merchandising system.

In an embodiment of the present invention, POS merchandising system 20 is configured to drive customer-facing electronic displays 28 to display a rotation of advertisements. Retail locations such as restaurants, cafes, and coffee shops typically sell a limited number of products. At such locations, a small number of best-selling products (e.g., between about four and about six) account for a large percentage of revenue, such as between about 30% and 40% of revenue. A larger number of mid-selling products (e.g., between about 10 and about 20) account for an additional 30% to 40% of revenue. The remaining low-selling products account for the balance of revenue.

In this embodiment, POS merchandising system 20 configures the rotation of advertisements to include a primary loop of advertisements of the best-selling products (and, optionally, new products to establish customer awareness). The system typically drives to displays to change the advertised product every 5 to 10 seconds. The merchandising system further configures the rotation of advertisements to include a secondary loop of advertisements of the mid-selling products. The system generally intersperses the advertisements of the secondary loop with those of the primary loop.

The system determines which products to advertise in the secondary loop, and/or whether to interrupt the primary loop with the secondary loop, responsively to the ordering of a product, as described hereinabove. Upon the ordering of a product, the system may advertise the product itself (such as if the product is a mid-selling product) on all of customer-facing electronic displays 28; on those of the line in which the order was placed; on those of the lines immediately adjacent to the line in which the order was placed; and/or on those of the line in which the order was placed and immediately adjacent lines. Alternatively or additionally, upon the ordering of a product, the system may advertise a product related to the ordered product, such as a mid-selling product related to the ordered product. When no recent ordering event has triggered such an advertisement, the system either advertises only products in the primary loop, or additionally intersperses products from the secondary loop randomly or in a predetermined sequence.

For some applications, the system implements dayparting in the primary and/or secondary loops, as is known in the advertising arts. For some applications, the system customizes the members of the primary and/or secondary loops by retail location, such as based on characteristics of the location, e.g., demographic characteristics. For example, the best-selling products at urban locations may be different from those at suburban locations.

In an embodiment of the present invention, POS merchandising system 20 advertises products related to an ordered product, instead of or in addition to the ordered product itself. For example, upon placement of an order to a low-selling product (e.g., carrot juice), the system may drive the customer-facing displays to present an advertisement for a similar, but greater-selling product (e.g., orange juice, a mid-selling product). A nearby customer who hears the phrase "carrot juice" and soon thereafter views an advertisement for "orange juice" may decide to additionally order orange juice, which was not initially an intended purchase. Such an additional sale generally represents incremental revenue for the retail establishment, because the addition of a mid-selling product to an order does not tend to result in the removal of a best-selling product the customer already intends to purchase.

Figure 3:
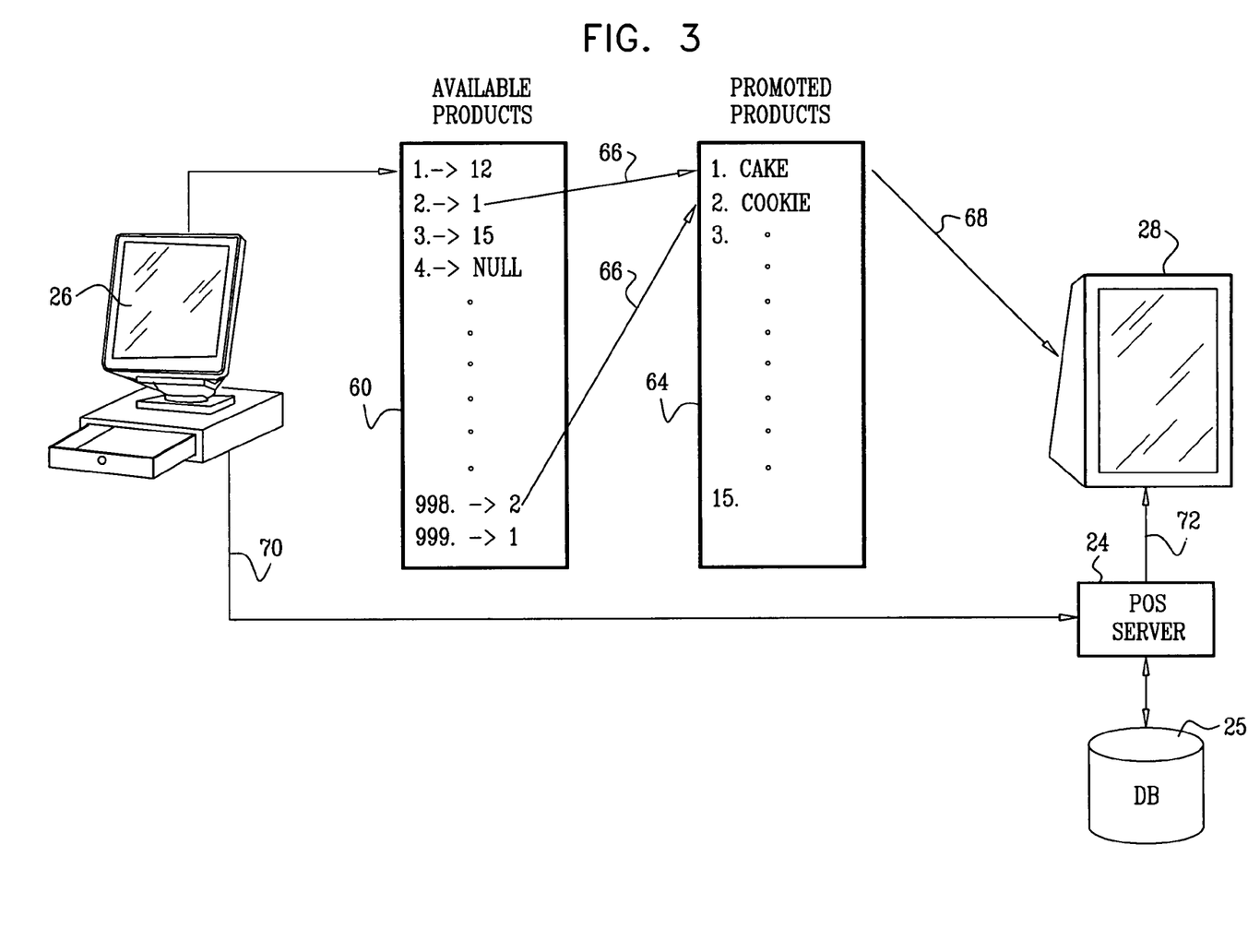
FIG. 3 is a schematic block diagram illustrating a learning process for increasing sales, in accordance with an embodiment of the present invention.

FIG. 3 is a schematic block diagram illustrating a learning process for increasing sales, in accordance with an embodiment of the present invention. During the learning process, each sale at one of POS terminals 26 triggers a lookup by POS server 24 (or central server 22) in a lookup table 60 listing the products for sale, as schematically indicated in FIG. 3 by an arrow 62. Lookup values in lookup table 60 reference a list 64 of promoted products. Arrows 66 schematically illustrate these links. When a customer purchases one of the linked products listed in lookup table 60, POS server 24 (or central server 22) performs an action associated with the linked promoted product, such as driving one or more customer-facing electronic displays 28 to display an advertisement for the promoted product, as schematically illustrated by an arrow 68, or another action described hereinbelow.

After each product sale, POS server 24 (or central server 22) checks whether the sold product was displayed in at least one customer-facing electronic display in the line in which the sale occurred or an immediately adjacent line within a certain amount of time before the occurrence of the sale, such as within 10 minutes before the sale, or within five minutes, as indicated schematically by arrows 70 and 72. Upon finding such a correlation, the POS server (or central server) records the sale event as potentially caused by the display of the advertisement, e.g., in database 25. The POS server (or central server) typically performs this check primarily or exclusively for products advertised in the secondary loop, because the products in the primary loop are generally constantly included in the advertisement rotation. For products advertised in the primary loop, the system tracks overall statistics, such as sales per day or month, which do not directly correlate with a specific display of an advertisement.

In an embodiment of the present invention, central server 22 implements a learning and/or genetic (DNA) algorithm to optimize promotional activities performed in response to product sale events. The server collects and tracks sales statistics, including sales rates (units per time unit, e.g., per hour) by product, by retail location, and overall.

The purchase or ordering of a product at one of POS terminals 26 triggers an action, such as:

- displaying an advertisement for one of the products on list 64 of promoted products (FIG. 3), on one or more of customer-facing electronic displays 28, as described hereinabove;
- displaying an advertisement for the product itself, on one or more of customer-facing electronic displays 28, as described hereinabove, such as on all of the displays at the retail location. The system generally performs this action only if the sold or ordered product appears on list 64 of promoted products;
- changing an environmental parameter, such as background music or lighting; or
- doing nothing.

The performance of an action often affects sales of an advertised product during a certain period of time following the action, e.g., during the ten minutes after the action, or the five minutes after the action. Central server 22 or POS server 24 analyzes the recorded sales rates of each product during these time periods to check whether performance of the action caused an increase in average sales of the product during these time periods. For some applications, the system sets initial actions for each product for each retail location, such as randomly, and evaluates the effectiveness of each of the actions. The system may then vary the actions over time to collect sales information for statistical analysis of effectiveness.

For some applications, central server 22 assigns a set of rules for each retail location, and uses the sets as DNA rule sets for input into a genetic (DNA) algorithm, as is known in the art of genetic algorithms. For example, the server may use techniques described in above-mentioned US Patent Application Publication 2003/0083936 to Mueller et al., mutatis mutandis. Each rule specifies a condition (such as a sale of a certain product) and an associated action to perform when the condition is satisfied. When the server finds that a given DNA rule set improves a measure of performance at a given a location, the server takes this set as a reference, and genetically combines the set with other successful sets to produce a new generation rule set. The fitness of each new set is evaluated until an optimal or satisfactory level of fitness is achieved for the overall chain, for groups of retail locations having common characteristics, and/or for individual retail locations. For some applications, the measure of performance to be optimized comprises sales (i.e., measured in dollars), such as total sales at the retail location, while for other applications, the server seeks to optimize sales of mid-selling items, or sales of best-selling items. For some applications, the measure of performance comprises gross margin, unit sales, and/or a combination of two or more of gross margin, unit sales, and sales. The server may also seek to minimize sales of certain products or types of products, for example if such a decrease is correlated with an increase in other more desirable products, e.g., which have higher gross margins.

Alternatively or additionally, server 22 evaluates individual rules. Rules found to produce successful results at one or more retail locations are tested at other retail locations. The server also takes into account a failure of a particular set of rules or particular rules to achieve improved results.

For some applications, one of the rules specifies a ratio of advertising time allocated to a first set of one or more products to advertising time allocated to a second set of one or more products. For example, the rule may specify a ratio of advertising time allocated to the primary loop and advertising time allocated to the secondary loop.

In an embodiment of the present invention, evaluating the measure of performance comprises assigning a weighting factor to each product, which represents the sales and/or importance attributed to a certain product. For example, even though a product may have relatively low sales, it may have a relatively high weight, for example because it is a new product that the retailer wants to promote, or it is a product which has an importance to the retailer for position/branding objectives.

For some applications, the server uses the following equation to score a set of rules taking into account weighting factors of the items:

$$total.score = \sum_{i=1}^{n} (current.sales_i - avg.sales_i) \cdot weight_i \quad \text{(Equation 1)}$$

For example, assume that server 22 is configured to promote the following products, which are assigned the following respective weighting factors:
Product A—weight 10
Product B—weight 20
Product C—weight 30

Further assume that server 22 implements the following set of rules (which also include products that are not promoted and are used only as triggers):
Rule 1—when Product H is purchased, show Product C
Rule 2—when Product Z is purchased, show Product B
Rule 3—when Product Q is purchased, do nothing
Rule 4—when Product A is purchased, show Product A (itself)
(Alternatively, the trigger may be a product order, rather than a product purchase.)

Assume that this set of rules results in the following sales results:
Product A achieves sales of 23 units per hour vs. a baseline of 20 units per hour (an increase of 3 units per hour)
Product B achieves sales of 16 units per hour vs. a baseline of 17 units per hour (a decrease of 1 unit per hour)
Product C has no change in sales
Applying Equation 1, the server calculates a total score of 10, as follows:

Total score=3*10+−1*20+0*30=10

The server evaluates this score to make a determination that this set of rules has a beneficial effect (although it may be improved). As mentioned above, the server uses genetic algorithm techniques to periodically (e.g., once per day) merge good sets of rules from multiple retail locations, to produce genetically more fit offspring rules. For example, each day the server may merge the best-performing set of rules among all the retail locations individually with each of the sets of rules of all the other retail locations, to produce a new sets of rules for each retail location that are offspring of the best-performing set of rules and all of the other sets of rules. This process is performed iteratively, to continuously optimize the deployed sets of rules at each location.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A computer-implemented method for data display, the method comprising:
receiving at a point-of-sale terminal a request for a product from a customer in a first line at a retail location having multiple adjacent customer lines, each line having a respective customer-facing electronic display;
automatically selecting, by a computer, an advertisement responsively to the requested product; and
displaying the advertisement on the respective customer-facing electronic display positioned at a second line, which is in proximity to the first line.

2. The method according to claim 1, wherein displaying the advertisement comprises displaying the advertisement within one minute after receiving the request.

3. The method according to claim 1, wherein selecting the advertisement comprises selecting an advertisement that promotes the requested product.

4. The method according to claim 1, wherein the requested product includes a first product, and wherein selecting the advertisement comprises selecting an advertisement that promotes a second product which is different from the first product and has a purchasing correlation with the first product.

5. The method according to claim 1, wherein the customer-facing electronic display positioned at the second line is a first customer-facing electronic display, and wherein displaying the advertisement comprises displaying the advertisement on the first customer-facing electronic display and on a second customer-facing electronic display positioned at the first line.

6. The method according to claim 1, wherein selecting the advertisement comprises using a genetic algorithm to improve a set of rules for selecting the advertisement.

7. A computer-implemented method for data display, the method comprising:
receiving at a point-of-sale terminal a request for a product from a customer at a head of a line in a retail location; and
responsively to receiving the request, automatically presenting, by a computer, an advertisement promoting the requested product to customers waiting in the line on a customer-facing electronic display in the retail location, wherein the line is a first line, and wherein presenting the advertisement comprises displaying the advertisement on the customer-facing electronic display positioned at a second line, which is in a proximity to the first line.

8. The method according to claim 7, wherein presenting the advertisement comprises displaying the advertisement within one minute after receiving the request.

9. The method according to claim 7, wherein presenting the advertisement comprises displaying the advertisement on the customer-facing electronic display positioned at the line.

10. The method according to claim 7, wherein presenting the advertisement comprises selecting the advertisement using a genetic algorithm to improve a set of rules for selecting the advertisement.

11. Apparatus comprising:

first and second point-of-sale (POS) terminals positioned respectively at a first and second lines in mutual proximity at a retail location having multiple adjacent customer lines;

first and second customer-facing electronic displays positioned respectively at the first and second lines; and a promotion processor, configured, upon receipt of a request for a product from a customer at the first POS terminal, to select an advertisement responsively to the requested product and to display the selected advertisement on the second customer-facing electronic display.

12. The apparatus according to claim 11, wherein at least one of the POS terminals comprises the promotion processor.

13. The apparatus according to claim 11, wherein the advertisement is displayed within one minute after receipt of the request.

14. The apparatus according to claim 11, wherein the advertisement promotes the requested product.

15. The apparatus according to claim 11, wherein the requested product includes a first product, and wherein the advertisement promotes a second product which is different from the first product and has a purchasing correlation with the first product.

16. The apparatus according to claim 11, wherein the promotion processor is configured to display the advertisement on both the first and second customer-facing electronic displays.

17. A computer software product comprising a tangible computer-readable medium in which program instructions are stored, which instructions, when read by a computer, cause the computer to receive a request for a product from a customer in a first line at a retail location having multiple adjacent customer lines, each line having a respective customer-facing electronic display, select an advertisement responsively to the requested product, and display the advertisement on the respective customer-facing electronic display positioned at a second line, which is in proximity to the first line.

18. The product according to claim 17, wherein the instructions, when read by the computer, cause the computer to display the advertisement within one minute after receiving the request.

* * * * *